May 5, 1970 W. DILLENBURGER ET AL 3,510,575

COLOR TELEVISION PICKUP APPARATUS EMPLOYING A SINGLE CAMERA TUBE

Filed Dec. 18, 1967 2 Sheets-Sheet 1

Inventors
Wolfgang Dillenburger
Richard von Felgel-Farnholz by Michael S. Striker Attorney

COLOR TELEVISION PICKUP APPARATUS EMPLOYING A SINGLE CAMERA TUBE

Filed Dec. 18, 1967 2 Sheets-Sheet 2

Inventor:
Wolfgang Dillenburger
Richard von Felgel-Farnholz
by Michael S Striker
Attorney

United States Patent Office 3,510,575
Patented May 5, 1970

3,510,575

COLOR TELEVISION PICKUP APPARATUS EMPLOYING A SINGLE CAMERA TUBE

Wolfgang Dillenburger, Niederramstadt, near Darmstadt, and Richard von Felgel-Farnholz, Darmstadt-Eberstadt, Germany, assignors to Fernseh GmbH, Bahnhof, Germany Filed Dec. 18, 1967, Ser. No. 691,355
Claims priority, application Germany, Dec. 17, 1966, F 50,996
Int. Cl. H04n 9/06
U.S. Cl. 178—5.4 16 Claims

ABSTRACT OF THE DISCLOSURE

An arrangement in color television pickup apparatus for generating a plurality of color primary signals through the use of a single television pickup tube. The object to be picked up is scanned so that separate and differently colored images are formed. These images are situated in planes containing diaphragms which have an array of alternate opaque and transparent strips disposed perpendicular to the direction of the line of scanning. The light passing through the diaphragm is imaged upon the photosensitive layer of the television pickup tube used in the apparatus. The image of each transparent strip of one of the diaphragms is immediately adjacent to the image of a transparent strip of another one of the diaphragms. Complete images of the object scanned are projected in mutually exclusive spectral ranges. Each of the images has the same chrominance value with regard to hue and saturation, over the entire picture area. Separation into the individual spectral ranges may be accomplished through the use of mirror or prism systems including dichroic layers.

BACKGROUND OF THE INVENTION

In a conventional method for generating primary signals such as red, green and blue, an image of the object to be picked up is projected upon the photosensitive layer of a television pickup tube through the use of an optical filter. The latter restricts the spectral range of the light. The color filter also contains strip-like filter elements of different colors. Opaque or transparent elements may be situated between successive groups of filter elements, for the purpose of generating indexing signals. The latter are used to direct the primary signals into channels appropriate to the different colors.

In another conventional arrangement of color cameras, two pickup tubes are employed. The light coming from the scanned object is split between the two pickup tubes through the use of a semi-reflecting mirror. One pickup tube provides the luminance signal, whereas the second pickup tube provides the color signals. In the optical path of the second pickup tube, is a color filter for the three primary colors. The latter are formed so that the optical image projected on the photosensitive layer of the second pickup tube, contains strips of the three primary colors situated perpendicular to the direction of the line of scanning. Successive groups of three color strips are separated by a black indexing strip. The output signal of this color pickup tube is therefore composed of a sequence of primary signals distributed into the red, blue and green color channels. The distribution is accomplished through a switching arrangement such as gate circuits synchronized by the signals obtained from the black strips.

The color strip filter required for the conventional arrangement has considerable disadvantages and is particularly difficult to construct. For the required large number of color strips or groups of color strips (of the order of 100) the individual color strips are very narrow. Accordingly, it becomes difficult to construct these with the required accuracy and precision. Furthermore, it is essential that very exact mutual boundaries be established. At the same time, it is difficult to insure that strips of the same color in the different groups have the same hue and the same transmission characteristic. Finally, tests have shown that the transmission of a color strip filter, of this type, is very low. As a result, only a small fraction of the available light can be used for generating the primary signals.

Accordingly, the present invention provides a color television pickup apparatus which includes an arrangement for forming separate differently colored images of an object. The differently colored images are formed in planes of light diaphragms, each having an array of alternate opaque and transparent strips disposed perpendicular to the direction of the line scanning. The light passing through the diaphragms is imaged upon the photosensitive layer of a television pickup tube. The optical arrangement is such that the image of the transparent strip of one of the diaphragms is immediately adjacent to the image of a transparent strip of another one of the diaphragms.

In accordance with the present invention, complete images of the object to be scanned are projected in mutually exclusive spectral ranges. Therefore, each of these images has the same chrominance value, over the entire picture area, with regard to hue and saturation. Separation into the individual spectral ranges may be accomplished in the conventional manner through the use of mirror or prism optical systems, including dichroic layers. These optical systems should have a very high optical efficiency so that substantially less light is lost than in the color-strip filters in the conventional arrangements.

The strip diaphragms required in the use of the present invention, are significantly simpler and easier to construct than the strip color filters. The construction is further simplified because the number of strip-like diaphragm apertures is smaller in proportion to the number of spectral ranges than the number of color strips in a color strip filter. All of the strip diaphragms required in the present invention, moreover, may be identically constructed. For the purpose of limiting the colored light to different adjacent portions on the photosensitive layer, it is only necessary to position the strip diaphragms in different positions relative to the respective optical images.

SUMMARY OF THE INVENTION

A color television pickup apparatus in which an optical system forms separate and differently colored images of an object that is scanned. The images are formed in planes in which diaphragms are provided. Each of the diaphragms has an array of alternate opaque and transparent strips disposed perpendicular to the direction of the line scanning. An imaging arrangement images light passing through the diaphragms upon the photosensitive layer of a television pickup tube used in the apparatus. The imaging is performed so that the image of each transparent strip of one of the diaphragms is immediately adjacent to the image of a transparent strip of another one of the diaphragms.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
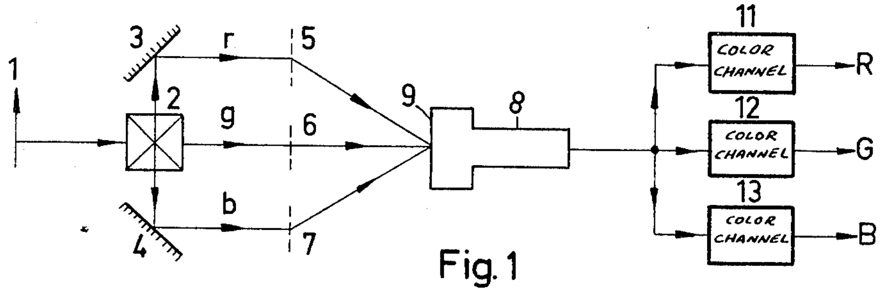
FIG. 1 is a functional schematic diagram of the color television pickup apparatus, in accordance with the present invention, and shows the geometric relationships associated with the optical system.

Referring to the drawing, and in particular to FIG. 1, the arrow 1 denotes the object to be scanned. A beam splitter 2 divides the light from the object 1 into mutually exclusive different spectral ranges. Although these are usually red, blue, and green components corresponding to the standard primary colors used in color television systems, they need not be necessarily of these color components. Through the use of the deflection mirrors 3 and 4, three parallel optical paths *r*, *g*, and *b* are obtained for the three colors red, green and blue, respectively. By inserting lenses or lens systems in the optical paths, it is possible to project real intermediate images of the object 1 on the planes of the respective strip diaphragms 5, 6 and 7. These real intermediate images are projected in different colors corresponding to their color components. For purposes of clarity, these lenses or lens systems have been omitted from the drawing. With additional lenses, not shown again for the sake of clarity, the three differently colored intermediate images are registeringly projected upon the photosensitive member 9 of a television pick-up tube. The strips of the diaphragms 5, 6 and 7 are positioned so that their images on the photosensitive member 9 of the pick-up tube 8 are perpendicular to the direction of the scanning line. The images of the slit-like apertures of the individual strip diaphragms 5, 6 and 7 are also located in close proximity to each other.

As a result, the signal provided by the pick-up tube 8 contains, in each line scanning period, a plurality of successive signal components coresponding to the scanning of the red, blue, and green image. These primary signals are then distributed to respective color channels 11, 12 and 13. Each one of these channels corresponds to one of the colors. In these channels the primary pulse signals are processed to form three simultaneous primary signals R, B and G. These latter signals are transmitted from the apparatus as output signals.

Figure 2:
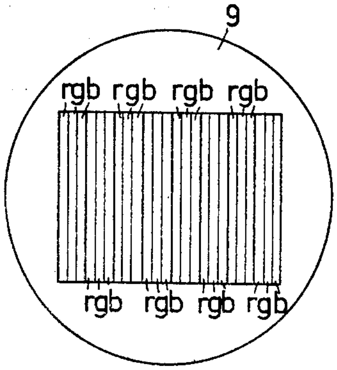
FIG. 2 is a layout diagram showing the image which is projected on the photosensitive layer of a pickup tube used in the apparatus of FIG. 1.

FIG. 2 shows the character of the optical image projected upon the photosensitive layer 9 of the camera tube 8 shown in FIG. 1. This image consists of a repetition of the sequence of strips *r*, *g*, and *b* corresponding to red, green, and blue respectively. The resolution of the primary signal is determined by the number of such groups or sequences of strips. If an individual luminance signal is produced in the conventional manner, by means of a second camera tube, the resolution of the primary signals may be substantially less than that of the luminance signal. Thus, the number of groups or sequences of strips may be small in comparison with the number of picture elements in the line direction. If, for example, the 625-line European standard is taken with a band width of 5 mc./s. for the luminance signal, a band width of the order of 1 mc./s. is found sufficient for the chrominance signal. Accordingly, the number of groups or sequences of strips in the optical image on the photosensitive layer of the pick-up tube may be in the order of 100. If the luminance signal is formed from the three primary signals instead of through the use of a separate camera tube, then the number of color strips is chosen to be sufficiently large so as to permit the full resolution of the pick-up tube to be utilized.

Figure 3:
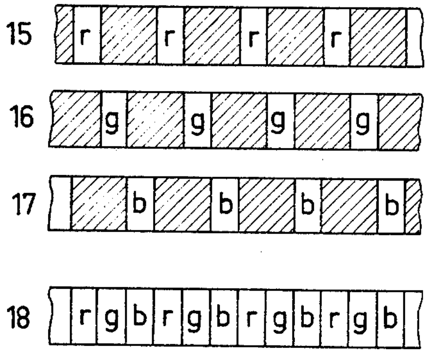
FIG. 3 is a diagrammatic representation of the strip diaphragms used in the apparatus of FIG. 1.

FIG. 3 represents schematically sections of the strip diaphragms 5, 6 and 7. The strip portion 15 illustrates the layer of the diaphragm 5 corresponding to the red optical channel. This strip portion 15 has slit-like apertures *r* separated by opaque strips having a width equal to $(n-1)$ times the width of a slit, where $n$ is the number of color components. In the usual case where $n=3$, the opaque strips are twice the width of the slit. As shown by the strip portions 16 and 17, the green and blue optical channels are identical in form with the red channel. They are, however, displaced in the plane of the respective intermediate image, in the direction perpendicular to that of the shutter strips. Thus, when taken in the direction of the scanning line, the amount of displacement is such that the images of the slit-like apertures in the diaphragm are adjacently located on the photosensitive layer of the pickup tube, upon which they are projected, as represented by the strip portion 18.

Figure 4:
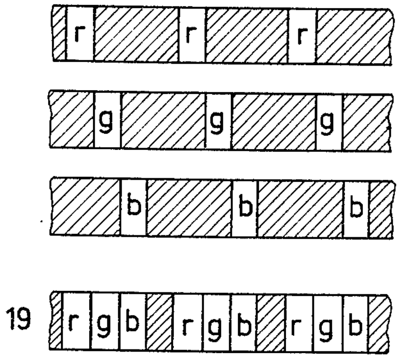
FIG. 4 is a diagrammatic representation of another embodiment of the strip diaphragms of FIG. 3.

FIG. 4 shows, schematically, sections of a modified form of strip diaphragms. In this configuration the widths of the opaque areas between the slits are $n$ times as wide as the slits. Thus, the width of the opaque areas is three times as wide as the slit itself. The three diaphragms are, however, also displaced in the direction perpendicular to the shutter slits, so that the three colored image strips of each set become adjacently located. Accordingly, a dark strip *s* is left between adjacent sets or sequences of color images on the photosensitive layer of the pickup tube. This is shown in the strip portion 19 in FIG. 4. The signal derived from the pickup tube as a result of its scanning the image of the dark strip, can be employed for synchronizing the switching arrangement used to distribute the signals among the three color channels.

Figures 5, 6, 7:
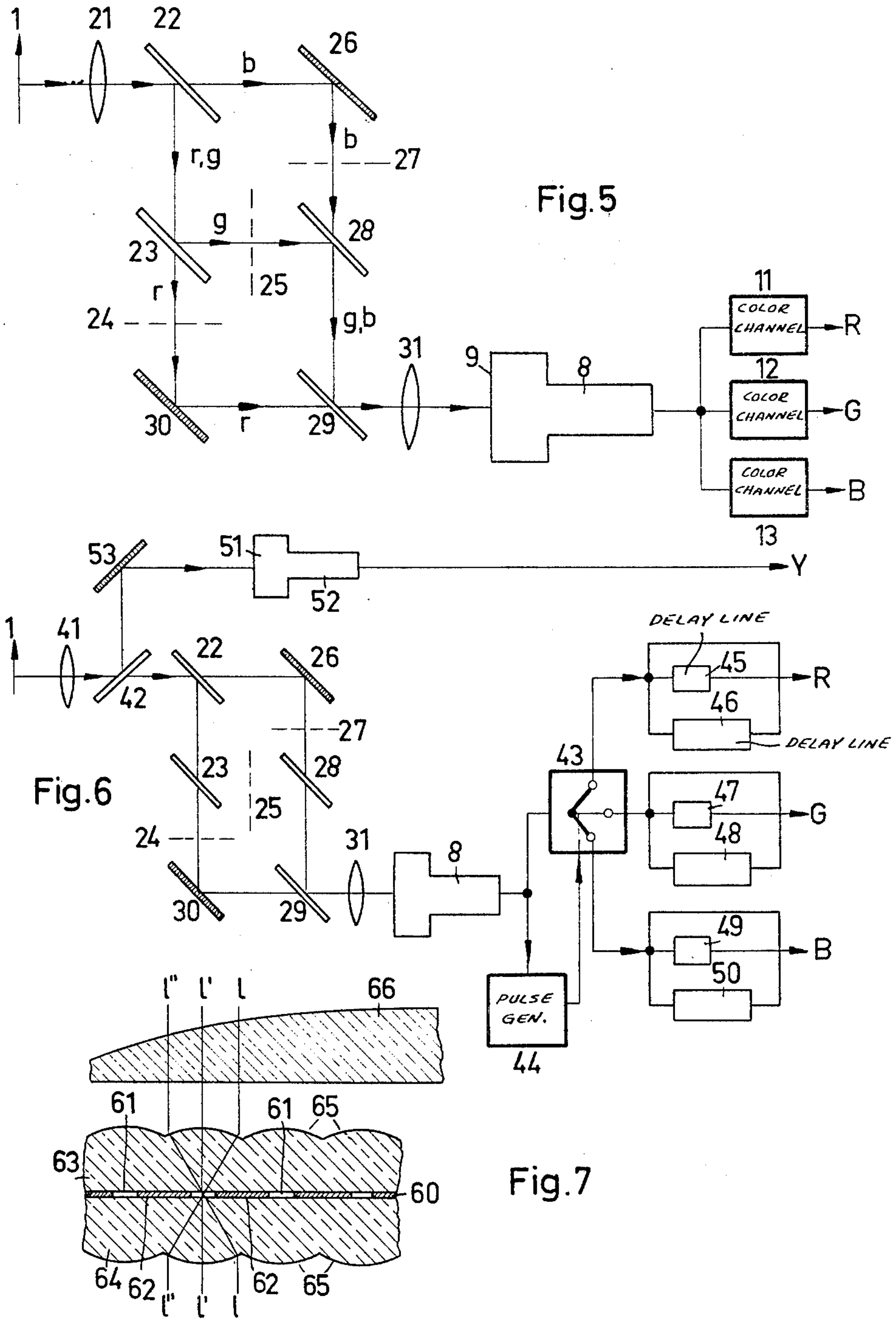
FIG. 5 is a functional schematic diagram and shows the optical arrangement of a preferred embodiment of the television pickup apparatus, in accordance with the present invention.
FIG. 6 is a functional schematic diagram of a television pickup apparatus in which a second television pickup tube is used for generating a luminance signal.
FIG. 7 is a partial cross-sectional view of a strip shutter device which may be used in the television pickup apparatus of the present invention.

FIG. 5 shows, in schematic form, a preferred embodiment of the optical system for television pickup apparatus, in accordance with the present invention. Light coming from the object 1 passes through an objective lens 21 and onto a first dichroic mirror 22. This latter mirror has a transmission characteristic such that light of shorter wavelength, corresponding to the blue spectral range, is transmitted. Light of longer wavelengths, on the other hand, corresponding to the green and red spectral ranges, is reflected. The reflected light falls upon a second dichroic mirror 23. This mirror has a cut-off limit at a longer wavelength than that of the mirror 22. Thus, the mirror 23 passes only the red spectral range and reflects the green.

The focal length of the objective lens 21 is determined so that the intermediate image planes, in which the real images fo the scanned object 1 are projected, occur after the light has been divided into three spectral ranges. If the lengths of the optical path from the lens to the three intermediate image planes are of equal length, and the plane of the red intermediate image is at the location 24, then the green intermediate image will be at the plane location 25. The blue light passed by the dichroic mirror 22 is deflected by a fully-reflecting mirror 26. The deflection of the blue light by the mirror 26 is such that the deflected light is parallel to the direction of the light reflected by the mirror 22. The plane of the blue intermediate image is located at the position 27 and may be seen to be parallel to the plane 24 of the red intermediate image.

Strip diaphragms constructed and designed as described above, are provided in the intermediate image planes 24, 25 and 27. Projected real images in different colors of the object 1 are in these intermediate image planes. The differently colored image strips resulting from the interposition of the strip diaphragms in the planes of the intermediate image, are now images upon the photosensitive layer 9 of the pickup tube 8. In this manner the differently colored image component strips are adjacently located to each other.

To combine the three sets of differently colored image strips and to project them onto the photosensitive layer of the pickup tube, an optical system is used which is analogous to that used for beam splitting and for projecting the three colored images in the intermediate image planes. This system includes two dichroic mirrors 28 and 29, a fully reflecting mirror 30, and a lens 31. The characteristics of the dichroic mirror 28 are similar to that of the mirror 22. At the same time, the mirror 29 has characteristics similar to that of the mirror 23. Accordingly, mirror 28 transmits the shorter-wavelength light of the blue optical channel without substantial attenuation. At the same time, the mirror 28 reflects the longer-wavelength green light of the green optical channel.

Similar to the mirror 23, the dichroic mirror 29 transmits the longer-wavelength light from the red channel, and reflects the shorter-wavelength light of the green and blue channels. After the dichroic mirror 29, the light in the three spectral ranges is again united. The lens 31 finally projects the real color images from the intermediate image planes, upon the photosensitive layer 9 of the pickup tube 8. The required condition that the optical path length between the lens 31 and the intermediate image planes be equal, is fulfilled by the arrangement of FIG. 5.

The signal output of the pickup tube 8 contains, in each line scanning period, successive components of the color component signals. This output signal is divided into three sequential color component signals as represented in FIG. 1. The color channels 11, 12 and 13 convert the sequential color component signals into simultaneous color component signals.

FIG. 6 shows, in a schemtic manner, a color television pickup arrangement in which a second pickup tube is employed to generate the separate luminance signal. Following the objective lens 41, is a semi-reflector 42 in the form of a mirror or a prism. The optical element 42 reflects a fraction of the light arriving from the object 1, without altering the spectral characteristics of the optical beam. The dichroic mirror 22 following the semi-reflector 42, is the same as described above in relation to FIG. 5.

The light transmitted by the semi-reflector 42, passes into an optical system which is structurally identical with that of FIG. 5. Thus, the optical system contains two pairs of similar dichroic mirrors 22, 28 and 23, 29, two fully reflective mirrors 28, 30, and identical strip diaphragms arranged perpendicular to the direction of line scanning in the planes 24, 25 and 27. These are the intermediate optical image planes. The projection lens 31 is also included.

Through the use of an electronic distribution switch 43, the primary signals associated with the same color are distributed to the appropriate one of three color channels. In practice the distribution switch may consist of three gate circuits. The switching device 43 may be synchronized by a train of pulses derived by a device 44 from dark indexing strips in the image. These dark strips are produced in a manner similar to that described above with reference to FIG. 4. The synchronization of the switching signal generator used to actuate the distribution switch or to open the gate circuits, may be performed only once at the beginning or at the end of each scanning line with the aid of the line synchronizing pulse. This, however, is dependent upon the condition that the spacing of the groups of color strips in the optical image is accurate and the linearity of line deflections is sufficiently high. The synchronization of the switching pulse generator may also be accomplished through indexing strips in the form of, for example, white strips present at the beginning or end of each line. With such an arrangement, the generation of the switching pulses becomes independent of the deflection amplitude. In this case, the indexing strips between the groups of color strips become unnecessary. As a result the optical image may be as described in relation to FIG. 3.

The primary signals in pulse form as derived from the distributor switch 43, are extended to fill in the intervals between the pulses. This is done in order to obtain simultaneous primary signals required to form a color television signal. The desired arrangement may be realized, for example, through the use of low-pass filters in the signal paths. Another possible arrangement, however, is illustrated in FIG. 6. In the latter, each of the color component signals in pulse form, is delayed by the amount of its own duration in one delay circuit. In another delay circuit, the pulse signal is delayed by twice its own duration. The two delayed signals are then added to the original signal.

In accordance with this arrangement, three color component signal channel delay lines 45, 47, and 49 are provided with a delay time equal to the duration of the color component pulses. The delay lines 46, 48 and 50 are designed to have delay times equal to twice the duration of the color component pulses. The outputs of the two delay lines in each color channel are then combined with the undelayed signal in that channel. With this configuration, the primary signals are extended into the periods in which they are not supplied by the pickup tube. As a result, simultaneous primary signals R, G and B appear at the three color channel outputs.

By means of the semi-reflector 42 and the fully reflecting mirror 53, the lens 41 also projects a panchromatic image of the object 1, onto the photosensitive layer 51 of a second pickup tube 52. Due to the double reflection of the panchromatic image, the photosensitive layers of the two pickup tubes are in parallel planes. At the same time, the length of the optical path between the lens 41 and the photosensitive layer 51 of the second pickup tube 52 is selected so that an image of the object is projected directly and without the formation of an intermediate image. The second pickup tube provides a luminance signal at the output terminal Y. The color television signal is then formed by coding, in the conventional manner, from the luminance signal and the three primary signals.

FIG. 7 shows an enlarged portion of a desirable embodiment of a strip diaphragm, in accordance with the present invention. Such strip diaphragms may be provided in FIGS. 5 and 6 at the positions designated by the reference numerals 24, 25 and 27. In this embodiment of FIG. 7, the strip diaphragm has a photographic film 60 which is exposed and developed so that it contains alternate parallel transparent strips 61 and opaque strips 62. Film 60 is placed between two transparent plates 63 and 64. The contours at the exterior of these plates 63 and 64 are shaped into adjacent cylindrically curved surfaces having their axes parallel to the direction of the shutter strips 61 and 62.

The opaque strips 62, in the design of FIG. 7, are twice as wide as the transparent strips 61, when considering a particular embodiment of the design of FIG. 7. The cylindrical lenses 65 are situated symmetrically with respect to the strips 61. Accordingly, all of the light falling upon an individual cylindrical lens passes through the transparent strip 61. The light is then again rendered parallel by the cylindrical lenses of the plate 64. Rays $1_r$, $1'_r$ and $1''_r$ identify the paths which produce this effect in the case of one pair of cylindrical lenses. A further field lens 66 is generally located in the vicinity of the strip shutter. The loss of light due to the presence of the opaque strip 62 is substantially avoided through the configuration of FIG. 7.

Variations of the embodiments shown may be readily made without departing from the scope of the present invention. Thus, by including a separate pickup tube for generating the luminance signal in FIG. 6, it is possible for only two primary signals to be generated. The optical elements necessary to provide the third color may thereby be omitted. Furthermore, the light from the object may be divided into only two intermediate images of different colors. Interlaced strips of these, obtained by the use of two strip shutters, are then combined to form the image projected upon the photosensitive layer of the primary signal pickup tube. Since only two strip diaphragms are used in such an embodiment, the ratio of the width of the opaque area to the width of the transparent portion is less than in the case where three colors are employed.

It will be understood that each of the elements described above, or two or more together, may also find a useful application in other types of color television pickup apparatus differing from the types described above.

While the invention has been illustrated and described as embodied in a color television pickup apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

What is claimed is:

1. In color television pickup apparatus, an arrangement comprising, in combination, a television pickup tube having a photosensitive layer; means for forming separate and differently colored images of a scanned object; a plurality of diaphragm means in planes in which said images are formed, each of said plurality of diaphragm means having an array of alternate opaque and transparent strips of equal number and width disposed perpendicular to the direction of line scanning; and imaging means for imaging light passing through said plurality of diaphragm means upon said photosensitive layer of said television pickup tube.

2. The arrangement in the color television pickup apparatus as defined in claim 1, including first dichroic reflector means for dividing the light from said object into a plurality of mutually exclusive spectral ranges, said light being divided among an identical plurality of optical paths imaged in the planes of said plurality of diaphragm means; and second dichroic reflector means for recombining the light passing through said plurality of diaphragm means into a single image upon said photosensitive layer of said television pickup tube, said second dichroic reflector means being identical to said first dichroic reflector means.

3. The arrangement in the color television pickup apparatus as defined in claim 2, wherein the widths of said opaque strips of said diaphragm means are equal to $(n-1)$ times the width of said transparent strip, where $n$ is the number of color components into which said light is divided.

4. The arrangement in the color television pickup apparatus as defined in claim 2, wherein the width of said opaque strips of said diaphragm means are equal to $n$ times the width of said transparent strip, where $n$ is the number of color components into which said light is divided, said optical image on said photosensitive member of said pickup tube including dark strips intervening between adjacent groups of said images.

5. The arrangement in the color television pickup apparatus as defined in claim 2, including scanning means for scanning the images of said strips and generating signals derived from said scanning; color channel means associated with each different color; and switching means synchronized with the scanning of said image and distributing said signals to said color channel means.

6. The arrangement in the color television pickup apparatus as defined in claim 4, including scanning means for scanning said images and generating signals derived from said scanning; color channel means associated with each different color; and switching means synchronized by the signal derived from scanning said dark strips of said image and distributing the signals generated by said scanning means to said color channel means.

7. The arrangement in the color television pickup apparatus as defined in claim 5, including means for synchronizing said switching means by the scanning of index strips produced in said image at the beginning of each scanning line.

8. The arrangement in the color television pickup apparatus as defined in claim 5, including means for synchronizing said switching means by signals derived from the scanning of index strips produced in said image at the end of each scanning line.

9. The arrangement in the color television pickup apparatus as defined in claim 1, including an additional television pickup tube having a photosensitive layer; an objective lens for imaging the light in said planes of said plurality of diaphragm means; and partial reflector means diverting a portion of said light passing through said plurality of diaphragm means; and partial reflector upon the photosensitive layer of said additional television pickup tube for providing a luminance signal.

10. The arrangement in the color television pickup apparatus as defined in claim 2, wherein each of said optical paths contains the same number of dichroic reflector means.

11. The arrangement in the color television pickup apparatus as defined in claim 10, including fully reflective means in each one of two of said optical paths.

12. The arrangement in the color television pickup apparatus as defined in claim 9, wherein the light diverted by said partial reflector means is imaged directly by said objective lens upon the photosensitive layer of said additional pickup tube.

13. The arrangement in the color television pickup apparatus as defined in claim 9, including fully reflective means in the optical path from said partial reflector means to said photosensitive layer of said additional television pickup tube, whereby the photosensitive layer of said additional pickup tube lies in a plane parallel to that of the photosensitive layer of the first pickup tube.

14. The arrangement in the color television pickup apparatus as defined in claim 5, including signal extending means for extending the duration of said signals derived from scanning said images.

15. The arrangement in the color television pickup apparatus as defined in claim 14, wherein said signal extending means is a low-pass filter.

16. The arrangement in the color television pickup apparatus as defined in claim 14, wherein said signal extending means comprises a plurality of delay lines in each signal path, said delay lines having respective delay times equal to different integral multiples of the duration of said signals; means for applying said signals to all of said delay lines; and means of adding the signal outputs from said delay lines, whereby the duration of said signals is extended.

References Cited

UNITED STATES PATENTS

| | | | |
|---|---|---|---|
| 2,733,291 | 1/1956 | Kell | 178—5.4 |
| 2,907,817 | 10/1959 | Teer | 178—5.4 |

ROBERT L. GRIFFIN, Primary Examiner

J. C. MARTIN, Assistant Examiner

U.S. Cl. X.R.

350—172